US009189557B2

(12) United States Patent
Singh et al.

(10) Patent No.: US 9,189,557 B2
(45) Date of Patent: Nov. 17, 2015

(54) LANGUAGE-ORIENTED FOCUSED CRAWLING USING TRANSLITERATION BASED META-FEATURES

(71) Applicant: Xerox Corporation, Norwalk, CT (US)

(72) Inventors: Nidhi Singh, Meylan (FR); Jean-Marc Coursimault, Revel (FR); Nicolas Monet, Montbonnot-Saint-Martin (FR); Herve Poirer, Meylan (FR)

(73) Assignee: XEROX CORPORATION, Norwalk, CT (US)

( * ) Notice: Subject to any disclaimer, the term of this patent is extended or adjusted under 35 U.S.C. 154(b) by 318 days.

(21) Appl. No.: 13/792,806

(22) Filed: Mar. 11, 2013

(65) Prior Publication Data

US 2014/0258261 A1 Sep. 11, 2014

(51) Int. Cl.
    *G06F 17/30* (2006.01)
(52) U.S. Cl.
    CPC .................................. *G06F 17/3087* (2013.01)
(58) Field of Classification Search
    None
    See application file for complete search history.

(56) References Cited

U.S. PATENT DOCUMENTS

| 2008/0104113 A1* | 5/2008 | Wong et al. ................. 707/104.1 |
| 2008/0228675 A1* | 9/2008 | Duffy et al. ..................... 706/10 |
| 2010/0293116 A1* | 11/2010 | Feng et al. ...................... 706/12 |
| 2012/0054192 A1* | 3/2012 | Song et al. ..................... 707/741 |

OTHER PUBLICATIONS

Author: Eda Baykan, Monika Henzinger, Ingmar Weber; Title: "Web Page Language Identification Based on URLs"; Date: Aug. 2008; Publisher: ACM; Pertinent Pages: whole document as attached (12 pages).*
Jayaraman, et al. "OmSE: Tamil aearch Engine—using open source software Greenstone", Tamil Internet, 2004, pp. 23-29.
Kuo, et al. "Mining Transliterations from Web Query Results: An Incremental Approach", Sixth SIGHAN Workshop on Chinese Language Processing, 2008, pp. 16-23.
Nayan, et al. "Named Entity Recognition for Indian Languages", Proc. of the IJCNLP-08 Workshop on NER for South and South East Asian Languages, Jan. 2008, pp. 97-104.
Raj, et al. "Transliteration based Search Engine for Multilingual Information Access" Proceedings of CLIAWS3, Third Intl. Cross Lingual Information Access Workshop, Jun. 2009, pp. 12-20.
Sato, S. "Crawling English-Japanese Person-Name Transliterations from the Web" WWW 2009, Apr. 20-24, 2009, pp. 1151-1152.

(Continued)

*Primary Examiner* — Anh Tai Tran
(74) *Attorney, Agent, or Firm* — Fay Sharpe LLP (57) ABSTRACT

A web page identified by a URL stored in a downloads queue is downloaded, and hyperlinks in the downloaded web page are identified. Each hyperlink is screened by parsing the hyperlink (optionally only the URL of the hyperlink) to identify features comprising character strings, computing for each feature values for one or more meta-features indicative of the hyperlinked web page being in a target language, aggregating the meta-feature values to generate a score for the hyperlink, and adding the URL of the hyperlink to the downloads queue conditional upon the score satisfying a screening criterion. The downloading, identifying, and screening are iteratively repeated to perform web crawling, and an index of web pages in the target language is constructed based on analysis of content of the downloaded web pages. The meta-features may include a transliterated target word meta-feature, a language code meta-feature, a country code meta-feature, or so forth.

20 Claims, 6 Drawing Sheets

(56) References Cited

OTHER PUBLICATIONS

Singh, et al. "Transliteration as Alignment vs. Transliteration as Generation for Crosslingual Information Retrieval", TAL, 2010, vol. 51, No. 2, pp. 95-117.

Stanfill, et al. "Toward Memory-Based Reasoning", Communications of the ACM, Dec. 1986, vol. 29, No. 12, pp. 1213-1228.
Vonitsanou, et al. "Keyword Identification within Greek URLs", *Polibits* 43 (2011): 75-80.

* cited by examiner

LANGUAGE-ORIENTED FOCUSED CRAWLING USING TRANSLITERATION BASED META-FEATURES

BACKGROUND

The following relates to the web crawling arts, database crawling arts, database mining arts, and related arts.

Web crawling is a process by which indexes are constructed for Internet search engines. The technique operates recursively, by indexing a current web page, and then following the hyperlinks to other web pages contained in the current web page and indexing those linked web pages, and so forth. Web crawling thus leverages the existing hyperlinked superstructure of the Internet to efficiently index web pages. The indexing can be respective to various aspects of the web page. In topic focused web crawling, a particular subject of interest is indexed. This can be based, for example, on the occurrence of keywords related to the subject, and the web page can be assigned a score based on the count of occurrences or other suitable metric or metrics of relevant keywords. As the Internet is global in extent, there is also interest in indexing documents respective to language. For example, a user may want to limit the search results to the user's native language, or knowledge of the language in which a web page is written can be leveraged to perform machine translation of the web page into the user's native language.

Web crawling may be untargeted, i.e. every page is to be indexed respective to a wide range of aspects. Alternatively, in focused web crawling, the goal is to index respective to a particular aspect, that is, respective to the focus of the web crawling. As illustrative examples, focused web crawling may be used to locate web pages specifically related to climate change, or may be used to locate pages in a specific language, such as Hindi.

While web crawling is a common application, more generally crawling can be applied to any database containing documents hyperlinked to other documents in the database (and, optionally, to other documents outside the database). As another variant, web crawling can be constrained to a particular domain or portion of the Internet, e.g. to a particular wiki.

BRIEF DESCRIPTION

In some illustrative embodiments disclosed as illustrative examples herein, a non-transitory storage medium stores instructions readable and executable by an electronic data processing device to perform a crawling method including the operations of (i) identifying hyperlinks in a current document wherein each hyperlink links to a linked document and includes anchor text and a linked document identifier; scoring each hyperlink by parsing the hyperlink to identify features comprising character strings, computing values for one or more meta-features for each feature wherein the meta-features are indicative of the linked document being in a target language, and aggregating the meta-feature values of the features of the hyperlink to generate a score for the hyperlink; and (iii) downloading documents linked by hyperlinks of the current document whose scores satisfy a screening criterion and not downloading documents linked by hyperlinks of the current document whose scores do not satisfy the screening criterion. In some embodiments the one or more meta-features include a transliterated target word meta-feature indicative of whether the feature is a transliterated word of the target language, a language code meta-feature indicative of whether the feature is the language code indicating the target language, and/or a country code meta-feature indicative of whether the feature is the country code of a country in which the target language is regularly used. In some embodiments the parsing operates on the linked document identifier and not on the anchor text so that the features are identified in the linked document identifier but not in the anchor text. In some embodiments the linked document identifier is a Uniform Resource Locator (URL). In some embodiments the aggregating comprises weighting each meta-feature value by a meta-feature weight for that meta-feature, and aggregating the weighted meta-feature values of the features of the hyperlink to generate the score for the hyperlink. In some such embodiments the crawling method further includes the operation of computing the meta-feature weights based on training data comprising hyperlinks or linked document identifiers each annotated as to whether the linked document is in the target language.

In some illustrative embodiments disclosed as illustrative examples herein, an apparatus comprises a non-transitory storage medium as, set forth in the immediately preceding paragraph, and an electronic data processing device operatively connected with the non-transitory storage medium to perform the crawling method by reading and executing the instructions stored on the non-transitory storage medium.

In some illustrative embodiments disclosed as illustrative examples herein, a method comprises: downloading from the Internet a web page identified by a uniform resource locator (URL) stored in a downloads queue; identifying hyperlinks in the downloaded web page wherein each hyperlink includes a URL and anchor text; and screening each hyperlink by parsing the hyperlink to identify features comprising character strings, computing for each feature values for one or more meta features indicative of the hyperlinked web page being in a target language, aggregating the meta feature values to generate a score for the hyperlink, and adding the URL of the hyperlink to the downloads queue conditional upon the score satisfying a screening criterion. The downloading, identifying, and screening are suitably performed by an electronic data processing device connected with the Internet. The downloading, identifying, and screening may be iteratively repeated to perform web crawling, and the method performed by the electronic data processing device may further comprise constructing an index of web pages in the target language based on analysis of content of the web pages downloaded from the Internet. In some embodiments the screening is not based on content of the web page identified by the URL of the hyperlink. In some embodiments the one or more meta-features include a transliterated target word meta-feature indicative of whether the feature is a transliterated word of the target language, a language code meta-feature indicative of whether the feature is the language code indicating the target language, and/or a country code meta-feature indicative of whether the feature is the country code of a country in which the target language is regularly used. In some embodiments the parsing operates on the URL of the hyperlink and not on the anchor text of the hyperlink so that the features are identified in the URL of the hyperlink but not in the anchor text of the hyperlink. In some embodiments the aggregating comprises weighting each meta-feature value by a meta-feature weight for that meta-feature and aggregating the weighted meta-feature values of the features of the hyperlink to generate the score for the hyperlink. In some such embodiments the method further comprises computing the meta-feature weights for the target language based on training data comprising URLs each annotated as to whether the web page identified by the URL is in the target language.

DETAILED DESCRIPTION

The illustrative embodiments disclosed herein relate to web crawling. However, the disclosed techniques are readily employed in crawling other hyperlinked databases, such as a corporate Intranet, a designated portion of the Internet (e.g. a particular wiki or a particular high-level domain), a large corpus of hyperlinked documents, or so forth. In the illustrative web crawling, the hyperlinks are typically specified in the form:

<a href="http://www.linkedsite.com/linkedpage">Visible text </a> where <a . . . > </a> are anchor delineators, the argument "http:// www.linkedsite.com/linkedpage" is the uniform resource locator (URL) of the linked web site, and the content Visible text disposed between the opening <a . . . > and closing </a> anchors is the anchor content that is actually visible, i.e. seen by the human viewer of the rendered web page (e.g., when rendered by a web browser; note that the anchor delineators and URL are typically not rendered). Although the anchor content is typically text as in this example, more generally the anchor content may be any visible content, e.g. text, an image, or so forth. Typically, the anchor content is rendered in a distinctive manner, for example by being underscored and rendered in a designated hyperlink font, to indicate to the viewer of the rendered web page that it is indeed a hyperlink. In some cases, however, the anchor content may not include distinctive rendering (for example, in some cases in which the anchor content is an image). In operation, the user can select the hyperlink by using a mouse, trackball, or other pointing device to select the rendered anchor content, or by touching the anchor content shown on a touch-sensitive screen, or by some other user interface mechanism, and in response the web browser or other application program downloads and renders the linked page (that is, the web page identified by the URL, namely the web page "http://www.linkedsite.com/linkedpage" in the above example. There are numerous operational variants—for example, in some systems right-clicking the hyperlink text may open the linked page in a new browser tab or window.

In other applications the hyperlink may have a different format, but generally includes hyperlink delineation (the <a . . . > . . . </a> anchor in the illustrative example), a URL or other linked document identifier (the argument "http://www.linkedsite.com/linkedpage" in the illustrative example), and the anchor content (the text Visible text in the illustrative example). Moreover, a given document may include hyperlinks constructed in two or more different formats, with the specific hyperlink type typically denoted by the hyperlink delineator or a parameter thereof. Some documents may also include internal hyperlinks, in which the linked document identifier points to a particular location in the current document. Such internal hyperlinks are suitably filtered out during the web crawling process as they do not lead to new web pages.

In untargeted or general crawling, each web page (or, more generally, document) is suitably downloaded and its content analyzed to index the web page respective to various indexing aspects, e.g. various topics, languages, and so forth. In this case, there is no disadvantage to downloading the target web page of each hyperlink as it will most likely (or even definitely) include some aspects that are to be indexed.

On the other hand, in focused crawling the goal is to index web pages (or more generally documents) respective to a particular aspect, such as a particular topic or only pages in a particular language. In this case, web pages that are unrelated to the indexed aspect are not indexed, and it is inefficient to download such unrelated web pages.

To reduce the likelihood of downloading unrelated pages, hyperlink screening can be employed. The screening analyzes the hyperlink itself, including the URL or other linked document identifier and/or the anchor content, in order to filter out hyperlinks that are unlikely to link to web pages pertaining to the focus of the crawling. In the case of focused topic crawling, a suitable approach is to search the anchor content, and possibly content on the web page immediately adjacent the hyperlink, for keywords relating to the focus topic. For example, climate change-focused web crawling may look for keywords such as "warming", "carbon", "weather", "polar bears", "ice caps", and so forth.

In the case of language-focused crawling, topical keyword searching is not relevant. For example, if the target language of the language-focused crawling is Hindi, it does not follow that any particular topical keywords are likely to be included in the rendered hyperlink content, since a web page written in Hindi can relate to any topic. A further difficulty is that the Internet is biased toward the English language, to the extent that it is sometimes assumed that a user whose native language is not English will nonetheless be able to read English as a second language. Under this assumption, web pages in English and web pages in the target language (e.g. Hindi) may be hyperlinked together in various arrangements (e.g. a page in English linking to a page in Hindi or vice versa), and English-language anchor text may be used in a hyperlink to a web page in the non-English target language (e.g. Hindi).

The English language bias of the Internet also extends to the character set used to represent textual content. Content processing components typically are designed to process text in the ASCII (American Standard Code for Information Interchange) character set or some variant thereof. The ASCII character set is exclusive to the Roman (i.e. Latin) alphabet (8-bit ASCII also supports Roman characters with diacritics such as umlauts). Representing a language such as Hindi that does not use the Roman alphabet requires the use of a different or extended character set, such as Unicode, which typically requires more than eight bits per character. Non-English text in such a different or extended character set runs the risk of corruption if transmitted via incompatible processing components. As a consequence, it is common for a non-English web page that does not use the Roman alphabet (e.g. a web page written in Hindi) to be identified by a URL limited to the Roman alphabet, for example represented by ASCII characters.

Disclosed herein are techniques for language-focused crawling with effective hyperlink screening. In the disclosed language-focused crawling techniques, the hyperlink screening is based on meta-features of words of the URL or other linked document identifier. The meta-feature values are weighted based on training against an annotated set of hyperlinks, and the meta-feature values of the words of the URL are aggregated to generate a score for the URL. If the score exceeds a screening threshold then the hyperlinked web page is actually downloaded to determine whether it is written in the target language.

Figure 1:
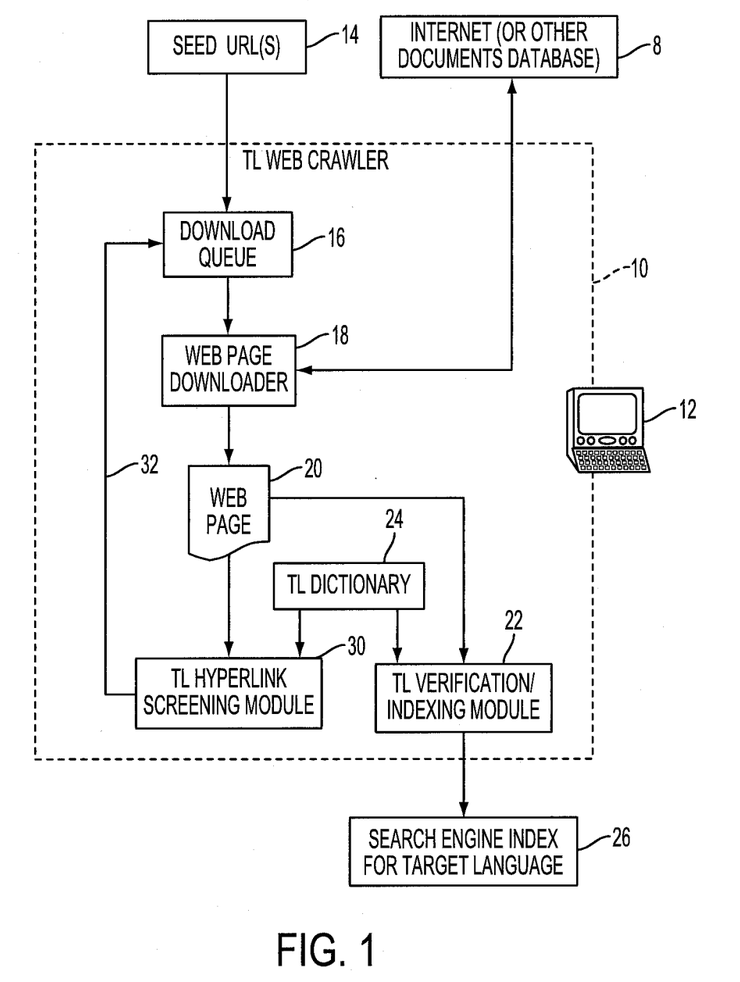
FIG. 1 diagrammatically shows a language-focused web crawling system.

With reference to FIG. 1, the Internet 8 (or another database of hyperlinked documents) is crawled by a target language (TL) web crawler 10. The TL web crawler 10 is implemented on a computer 12 or other electronic data processing device. For example, the computer 12 may be an Internet-based server, a personal computer, or so forth. The disclosed functionality of the IL web crawler 10 may additionally or alternatively be embodied as a non-transitory storage medium (not shown) such as a hard disk or other magnetic storage medium, random access memory (RAM), read-only memory (ROM), or another electronic storage medium, an optical disk or other optical storage medium, a combination of the foregoing, or so forth, which is readable by the computer 12 and which stores instructions executable by the computer 12 to perform the functions of the TL web crawler 10. To initiate the web crawling, the TL web crawler 10 receives one or more seed URLs 14 that are loaded into a download queue 16. The next URL in the download queue 16 is downloaded from the Internet 8 by a web page downloader 18 to generate a current web page 20 to undergo processing. A target language verification/indexing module 22 processes the current web page 20 to determine whether the text of the web page 20 is in the target language. For illustrative purposes, the illustrative target language is Hindi; however, other natural languages are contemplated as the target language, such as Greek, Russian, or so forth. The verification/indexing module 22 may use any suitable process for assessing whether (or, in some embodiments, to what degree) the web page 20 is written in the target language. For example, the text characters can be analyzed to determine whether they are consistent with the target language, e.g. using the Devanagari alphabet in the case of Hindi, or the Greek alphabet in the case of Greek, or so forth). As an additional or other analysis, the text can be tokenized by identifying spaces or other stop characters, and the tokens checked against a target language dictionary 24 to determine whether the tokens constitute words in the target language. Based on such analysis, the verification/indexing module 22 determines whether the web page 20 is in the target language and, if so, adds (the URL of) the web page 20 to a search engine index 26. Optionally, the verification/indexing module 22 may quantitatively score the web page, using a metric such as the percentage of tokens corresponding to TL words found in the TL dictionary 24. In such an approach, a web page that is written in a mixture of English and Hindi would score lower than a web page written entirely in Hindi. The score may be included as metadata associated with the web page URL in the index 26, and used to annotate search results.

A target language hyperlink screening module 30 operates in parallel with, or before, or after, operation of the verification/indexing module 22. The screening module 30 identifies hyperlinks in the web page 20 and screens each identified hyperlink to assess the likelihood that the linked web page is in the target language (e.g. Hindi). The screening is performed based on the content of the hyperlink, including the URL and, in some embodiments, also the anchor content. The screening is not based on the content of the linked web page, and hence the screening is performed by the screening module 30 without actually downloading the linked web page. Hyperlinks assessed as likely to link to a web page in the target language (as measured by a suitable quantitative metric computed from the URL of the hyperlink) are added to the download queue 16.

After the current web page 20 is processed by the verification/indexing module 22 and the screening module 30, the crawling operates recursively 32 to download the next web page in the download queue 16 which then serves as the (new) current web page for processing.

Figure 2:
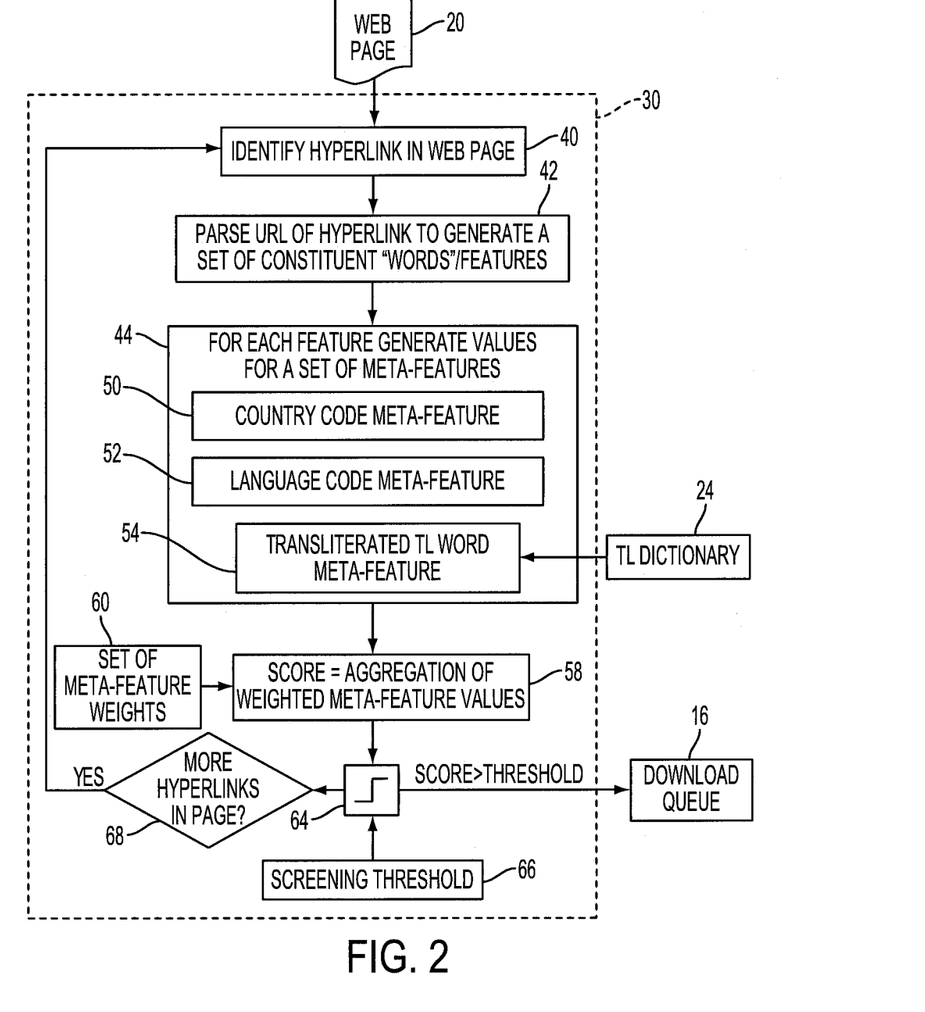
FIG. 2 diagrammatically shows the target language hyperlink screening module of the web crawling system of FIG. 1.

With reference to FIG. 2, an illustrative embodiment of the screening module 30 is described in further detail. In an operation 40, a hyperlink in the current web page 20 is identified. In an operation 42, the URL of the hyperlink is parsed to generate a set of constituent "words" making up the URL. In this context, the term "word" is imprecise because a URL does not necessarily follow natural language rules. For example, while adjacent words are separated by spaces in most natural languages, spaces are not allowed in URLs and so words may be separated by other stop characters (e.g. a period, a dash, or so forth) or may not be separated at all, i.e. the words may be run together. Moreover, some "words" of a URL may not be natural language words at all. For example, the international web site for the country of India has the URL http://www.india.gov.in/ where the "word" in is a country code representing the country of India. The Hindi language version of this web site has the URL http://www.india.gov.in/hi/ where the added "word" hi is a language code indicating the web page is in Hindi. Accordingly, as used herein the "words" output by the parsing are referred to as "features", which encompass both natural language words and any other character strings identified by the parsing. (Note that in this context a character string may include only a single character, e.g. "a" is a character string including only a single character). In parsing nomenclature, these features are sometimes called "tokens". In general, "stop words" such as http and www are stripped by the parsing, and delineators such as the forward slash ("/") are recognized as separators interposed between adjacent features. Thus, the parsing of the URL http://www.india.gov.in/ is the set of features {india, gov, in} while the parsing of the URL http://www.india.gov.in/hi/ is the set of features {india, gov, in, hi}. In some embodiments the parsing maintains the feature order of the URL, while in other embodiments the parsing does not maintain the feature order of the URL. As another example, the Hindi language Indian government web site for importers and exporters has the URL http://india.gov.in/hi/people—groups/professional/importers —and —exporters which is parsed to yield the set of features {india, gov, in, hi, people, groups, professional, importers, and, exporters} where again the feature in is the country code representing the country of India and the feature hi is the language code indicating the web page is in Hindi.

In the illustrative embodiments, the parsing operation 42 operates only on the URL of the hyperlink. Thus, the hyperlink:

<a href="http://www.india.gov.in/hi/">Indian government </a> is parsed to generate the set of features {india, gov, in, hi}. However, it is contemplated in a variant embodiment to also parse the anchor content, in which case the set of features would be {india, gov, in, hi, Indian, government}.

With continuing reference to FIG. 2, the features of the hyperlink are processed by an operation 44 to generate, for each feature, a set of meta-feature values. In the illustrative examples, three meta-features are employed: a country code meta-feature 50; a language code meta-feature 52; and a transliterated target language word meta-feature 54.

The country code meta-feature 50 has value "1" (or some other designated "affirmative" value) if the feature is the country code of a country in which the target language is regularly used, and has value "0" (or some other designated "negative" value) otherwise. In the illustrative case of Hindi, the feature in would be assigned country code value "1" since this is the country code of India, which is a country in which Hindi is commonly used.

Similarly, the language code meta-feature 52 has value "1" if the feature is the language code for the target language, and has value "0" otherwise. In the illustrative case of Hindi, the feature hi would be assigned language code value "1" since this is the language code for Hindi, and all other features would be assigned language code value "0".

The transliterated target language word meta-feature 54 has value "1" if the feature corresponds to a transliterated word of the target language, and has value "0" otherwise. Transliteration is the mapping of letters of one alphabet to letters of another alphabet. In view of the English bias of the Internet, what is generally of interest is transliteration of letters of a non-Roman alphabet to the Roman alphabet used in English. In the illustrative case of Hindi as the target language, this corresponds to mapping of the Devangari letters of Hindi to Roman letters. A standardized transliteration system is preferably employed. For Hindi, some standard transliteration systems include Hunterian transliteration, the IAST (International Alphabet of Sanskrit Transliteration) system, Harvard-Kyoto transliteration, and ITRANS transliteration. An ASCII based transliteration method such as Harvard-Kyoto or ITRANS may be preferable since URLs are typically expressed in ASCII characters. In a suitable approach, the feature is assumed for the purposes of testing to be a transliteration and is therefore compared with the transliterations stored in the target language dictionary 24. The transliterated word meta-feature is then assigned value "1" if a dictionary match is found, and "0" otherwise. In this approach, the target language dictionary 24 suitably includes Romanized transliterations for the term entries of the dictionary, which is common for Hindi dictionaries. It is contemplated to relax the requirement for an exact match, e.g. in one relaxed approach the closest match is found and (if not exact) then an edit distance between the feature and the closest dictionary entry is computed and a match is accepted if the edit distance is sufficiently small.

As used herein, the term "transliteration" is intended to be broadly construed as encompassing any standard approach for Romanization of text that is natively written in a non-Roman script. Thus, by way of illustrative example, transliteration as used herein encompasses pinyin representation of Chinese text, as well as various transcription approaches.

The meta-features 50, 52, 54 are illustrative examples, and additional or other meta-features may be employed. For example, a target language word meta-feature may be employed, which has value "1" if the feature is in the target language dictionary 24 and value "0" otherwise. This feature may be useful if, for example, the target language uses the Roman alphabet (so that transliteration is not required) or if the URL is expressed in a character set that allows text of the target language to be represented directly.

With continuing reference to FIG. 2, in an operation 58 the meta-feature values for the features of the hyperlink are weighted and aggregated to generate a score for the hyperlink. The operation 58 weighs each meta-feature value by a weight for that meta-feature, using a set of meta-feature weights 60. In the illustrative example having three meta-features 50, 52, 54, the set of meta-feature weights 60 includes three weights: a first weight for the country code meta-feature 50; a second weight for the language code meta-feature 52; and a third weight for the transliterated word meta-feature 54. These weights are suitably generated by optimization respective to an annotated training set of hyperlinks labeled as to whether or not they link to web pages in the target language. Alternatively, if the number of meta-features is small (e.g., three meta-features in the illustrative example) the weights 60 may be chosen manually. The number of meta-feature values in the aggregation equals the number of features times the number of meta-features. For example, the set of features {india, gov, in, hi} includes four features, each of which is assigned three meta-feature values for the country code, language code, and transliterated word meta-features, yielding twelve meta-feature values in the aggregation representing the hyperlink. The aggregation method for meta-features could be either deterministic or (more generally) stochastic. A stochastic aggregation method could compute probabilistic relevance of each feature to the target language, and then scale the probabilistic relevance using respective weight of meta-features that correspond to the feature. The aggregated/combined probabilistic relevance of all features could then be interpreted as the score of the hyperlink.

With continuing reference to FIG. 2, the score for the hyperlink computed in the operation 58 is compared in a thresholding operation 64 with a screening threshold 66. If the score is greater than the threshold then the URL of the hyperlink is added to the download queue 16; if the score is less than the threshold then the URL is discarded as being unlikely to link with a web page in the target language. The rare case in which the score exactly equals the threshold can be chosen to go either way). A suitable value for the screening threshold 66 can be determined using a training set of URLs labeled as to whether they link to target language web pages, either automatically or manually.

In a decision 68, it is determined whether the current web page 20 contains more hyperlinks to be screened, and if so processing flows back to the operation 40 to identify and subsequently process the next hyperlink.

With brief returning reference to FIG. 1, the recursive web crawling examines each web page in the download queue 16 and adds hyperlinks of that web page that pass the screening performed by the screening module 30 into the queue 16. This means that, after the initial seeding of URL or URLs 14, this queue 16 is populated with URLs of hyperlinks assessed by the screening module 30 as being likely to be in the target language. This can be useful since web pages in the target language are expected to be more likely to hyperlink to other web pages also in the target language as compared with web pages that are not in the target language. However, for some applications this can produce an undesirable bias in the crawling process as it will tend to follow pages in the target language that link to other pages in the target language. This effect is countered to some degree because the screening performed by the screening module 30 is only approximate, being based on the hyperlink content and not on the content of the linked web page itself. Thus, some pages that are not actually in the target language are likely to be added to the queue 16. The degree to which this occurs can be controlled by tuning the threshold 66 of the screening (see FIG. 2): as the threshold 66 is decreased the number of non-target language pages added to the queue 16 should increase. To further diversify the crawling process, it is contemplated to occasionally add new seed URLs to the download queue 16 from other sources (not shown), or to include a randomization factor that occasionally adds a URL to the queue 16 whose score is low (i.e. below the threshold 66).

In the following, a worked-out example of the web crawling system of FIGS. 1 and 2 is described, in which the target language is Hindi.

In the worked out example, the meta-feature weights 60 are optimized using an annotated training set in which URL's are labeled as to whether or not they link to web pages in Hindi. The value difference metric (vdm) is used, which is defined as follows. Given an attribute a with two possible attribute values (a=x) and (a=y), the VDM defines the distance between the two values x and y as:

$$vdm_a(x, y) = \frac{1}{|dom(T)|} \sum_{t \in dom(T)} \left| \frac{N(a = x | t)}{N(a = x)} - \frac{N(a + y | t)}{N(a = y)} \right|$$

where N(a=x) is the number of cases in the training set for which value x is assigned to attribute a, N(a=y) is the number of cases in the training set for which value y is assigned to attribute a, N(a=x|t) is the number of cases for which the value tdom(T) of the target variable T co-occurs with the value x of attribute a, and N(a=y|t) is the number of cases for which the value tdom(T) of the target variable T co-occurs with the value y of attribute a.

---

Algorithm 1: Method for learning meta-features selectivity

---

Input: H⟨h⟩ - List of on-target training URLs
Input: H'⟨h⟩ - List of off-target training URLs
Input: $\Omega_M$ - Set of meta-features 1  begin
2  | V⟨b⟩ ← ∅, V'⟨b⟩ ← ∅, F⟨f⟩ ← ∅, K ← ∅
3  | T ← [0,1]
4  | foreach h ∈ H do
5  |    F⟨f⟩ ← Extracted features of h
6  |    foreach f ∈ F do
7  |    |   $b_f$ ← ∅
8  |    |   foreach $m_i$ ∈ $\Omega_M$, i = 1, 2, ..., $|\Omega_M|$ do
9  |    |   |   $b_f[i] \leftarrow \begin{cases} 1, & \text{if f satisfies the characteristic property of } m_i; \\ 0, & \text{otherwise.} \end{cases}$
10 |    |   end
11 |    |   Add $b_f$ to V
12 |    end
13 | end
14 | foreach h ∈ H' do
15 |    Repeat steps from 5-10
16 |    Add $b_f$ to V'
17 | end
18 | foreach $m_i$ ∈ $\Omega_M$, i = 1, 2, ..., $|\Omega_M|$ do
19 |    $N(m_i = 1|T = 1) = \sum_{j=1}^{|V|} b_j[i]$
20 |    $N(m_i = 0|T = 1) = |V| - N(m_i = 1|T = 1)$
21 |    $N(m_i = 1|T = 0) = \sum_{j=1}^{|V'|} b_j[i]$
22 |    $N(m_i = 0|T = 0) = |V'| - N(m_i = 1|T = 0)$
23 |    $N(m_i = 1) = N(m_i = 1|T = 1) + N(m_i = 1|T = 0)$
24 |    $N(m_i = 0) = N(m_i = 0|T = 1) + N(m_i = 0|T = 0)$
25 |    foreach t ∈ T do
26 |    |   $sel(m_i, t) = \left| \frac{N(m_i = 1 | t)}{N(m_i = 1)} - \frac{N(m_i = 0 | t)}{N(m_i = 0)} \right|$
27 |    end
28 |    $sel(m_i) \leftarrow \frac{\sum_{t \in dom(T)} sel(m_i, t)}{|dom(T)|}$
29 |    $K[i] \leftarrow sel(m_i)$
30 | end
31 end

---

An attribute a is defined to be important if a has a high selectivity over the value domain dom(T) of the target variable T. The degree of selectivity directly corresponds to the importance (weight) of the attribute a. So, if different values of an attribute a indicate different target values, then the attribute is considered to be selective. The partial selectivity of an attribute a combined with a value t of the target variable T is defined as follows:

$$sel(a, t) = \frac{1}{\binom{|dom'(a)|}{2}} \sum_{x, y \in dom(a)} \left| \frac{N(a = x | t)}{N(a = x)} - \frac{N(a = y | t)}{N(a = y)} \right|$$

where x≠y. To compute the global selectivity of an attribute a, the partial selectivities sel(a,t) are averaged in the following manner:

$$sel(a) = \frac{\sum_{t \in dom(T)} sel(a, t)}{|dom(T)|}$$

Algorithm 1 sets forth a learning process for learning of the set of meta-feature weights 60. The Algorithm operates on a training set including a set of on-target training URLs denoted by H (i.e. URLs that link to web pages in Hindi) and a set of off-target training URLs denoted by H' (i.e. URLs that do not link to web sites in Hindi). The set of meta-features is denoted by M. In the illustrative example, M=3. In Algorithm 1 Line 3, the target variable T is defined which is a binary variable that can have value "0" or "1". If t=1 this implies that the URL is on-target, while t=0 implies the URL is off-target. Processing of the on-target URLs in H begins in Line 4. The individual "words" (i.e. features) are extracted from h in Line 5 by delimiting the URL using non-letter characters like the colon (":"), forward slash ("/"), and so on, to construct the set of features of h. (In this extraction procedure, non-informative features such as stop-words like "http", "ftp", and so forth, are excluded.) For each feature f, it is determined whether the feature satisfies the characteristic property of each meta-feature m. By "characteristic property", the defining property is meant, e.g., the transliteration property of meta-feature based on transliteration. Based on this, a Boolean vector $b_f$ is defined for each feature f and is added to the vector V. By way of illustrative example, consider the case of FIG. 2 in which there are three meta-features denoted here as $m_0$, $m_1$, $m_2$ corresponding to the transliterated word, country code, and language code meta-features, respectively. If a feature f satisfies the characteristic properties of $m_0$ and $m_2$ but not $m_1$, then the vector $b_f$=[1,0,1].

In Lines 14-17 the process of Lines 5-10 is repeated for the off-target variables in H' and the vector V' is populated with the resulting vectors $b_f$ for each feature f of each URL in H'.

Then, for each meta-feature $m_i$ the value $N(m_i=1|T=1)$ is calculated in Line 19 which is the number of features in on-target training URLs that satisfied the characteristic property of $m_i$ as follows:

$$N(m_i = 1 | T = 1) = \sum_{j=1}^{|V|} b_j[i]$$

Similarly, the value $N(m_i=0|T=1)$ is calculated in Line 20 which is the number of features in on-target training URLs that did not satisfy the characteristic property of $m_i$ as follows:

$$N(m_i=0|T=1)=|V|-N(m_i=1|T=1)$$

In analogous fashion, $N(m_i=1|T=0)$ and $N(m_i=0|T=0)$ are calculated in Lines 21-22.

In Line 23, the value $N(m_i=1)$ is calculated. Since meta-feature $m_i$ is binary and can have only two values ("0" or "1"), the partial selectivity sel($m_i$,t) of the meta-feature $m_i$ is calculated for each value t of the target variable T in Line 26 in the following manner:

$$sel(m_i, t) = \left| \frac{N(m_i = 1 | t)}{N(m_i = 1)} - \frac{N(m_i = 0 | t)}{N(m_i = 0)} \right|$$

where this calculation is repeated for each meta-feature in the loop of Lines 25-27. Thereafter, the global selectivity sel($m_i$) of the meta-feature $m_i$ is computed in Line 28. These values are stored in Line 29 as the set of meta-feature weights 60 denoted as the vector K.

The web crawling corresponding to FIG. 1 is performed using Algorithm 2, which begins with the list of seed URLs 14 denoted by U, the set of meta-features denoted by $\Omega_M$, the vector K containing the selectivity factor of each meta-feature in $\Omega_M$ (that is, the set of weights 60 computed by Algorithm 1), and the minimum threshold value for hyperlinks denoted by τ. Each hyperlink u∈U is assigned a score $s_u$ depending on how likely it is to be on-target (i.e., linked to a web page in Hindi), and only those hyperlinks that are assigned a score greater than or equal to τ are selected for crawling by Algorithm 2.

The crawling process of Algorithm 2 Lines 3-23 continues iteratively until a stop criterion is met in Line 23. The stop criterion can be in terms of say, the number of downloaded pages, the number of external hyperlinks encountered, time elapsed in the crawling process, depth of the crawl graph, or so forth.) In Line 4-7, for each hyperlink u in the list of seed hyperlinks U, the page $g_u$ pointed to by u is downloaded (i.e., by downloader 18 of FIG. 1) and the external hyperlinks contained in the current web page $g_u$ are extracted. These external hyperlinks are stored in a list denoted by E.

Processing of each external hyperlink u in E begins at Line 8. Similar to what was done in Algorithm 1, the individual "words" (i.e. features) are extracted from u in Line 9 by delimiting the URL using non-letter characters. For each feature f, it is determined whether f satisfies the characteristic property of each meta-feature $m_i$. Based on this, a Boolean vector $b_f$ is created for each feature f, as in Algorithm 1. Thereafter, the weight of feature f is computed by taking a dot product of the vector $b_f$ and $K^T$ in Line 15 (where $K^T$ denotes the transpose of the weights vector K).

---

Algorithm 2: Focused crawling by classifying URLs based on meta-features

```
Input: U⟨u⟩ - List of seed URLs
Input: Ω_M - Set of meta-features
Input: K - Vector containing the selectivity factor of each meta-feature
Input: τ ∈ [0,1] -Minimum threshold value for hyperlinks
1  begin
2  |  U⟨u⟩ ← ∅, F⟨f⟩ ← ∅, E⟨u⟩
3  |  repeat
4  |  |    foreach u ∈ U do
5  |  |    |   Download g_u
6  |  |    |   E ← Fetch external hyperlinks from g_u
7  |  |    end
8  |  |    foreach u ∈ E do
9  |  |    |   F⟨f⟩ ← Extracted features of h
10 |  |    |   foreach f ∈ F do
11 |  |    |   |   b ← ∅
12 |  |    |   |   foreach m_i ∈ Ω_M, i = 1, 2, . . . , |Ω_M| do
13 |  |    |   |   |   b[i] ← { 1, if f satisfies the characteristic property of m_i;
                                0, otherwise.
```

Algorithm 2: Focused crawling by classifying URLs based on meta-features

```
14  |  |     |     |    end
15  |  |     |     |    w_f ← b · K^T
16  |  |     |     end 17  |  |     |     s_u ← p(T = 1) ∏_{f∈F} p(f | T = 1)^{w_f}

18  |  |     |     if su ≥ τ then
19  |  |     |     |    Add u to U'
20  |  |     |     end
21  |  |     |     U ← U'
22  |  |     end
23  |  until stop criteria is met
24  end
```

Having calculated the weights of each feature f of the external hyperlink u, a score is assigned to hyperlink u that reflects how likely it is to be on-target. A suitable approach uses Weighted Naive Bayes (see Zhang et al., "Learning weighted naive bayes with accurate ranking", IEEE Transactions on Pattern Analysis and Machine Intelligence, 2004) in which the classification of an example G represented by a vector $(a_1, a_2, \ldots, a_n)$ is calculated as follows:

$$V(g) = \operatorname*{argmax}_c p(c) \prod_{i=1}^{n} p(a_i | c)^{w_i}$$

where c is the value of class variable. In the instant case, since what is of interest is finding a numeric score reflecting the probability of hyperlink u being on-target, the score equation (in Algorithm 2 Line 17) is suitably:

$$s_u = p(t = 1) \prod_{f \in F} p(f | t = 1)^{w_f}$$

If this score is greater than or equal to the minimum score threshold value τ, then the hyperlink u is selected for crawling and is added to the list U' in Line 19. In Line 21, the list of URLs to be crawled, i.e., U is set to U'. This corresponds to the screening module 30 of FIG. 1 adding the URLs that satisfy the screening threshold 66 to the download queue 16.

The approach employing Algorithm 1 and Algorithm 2 was applied to a crawl task in which 870 URLs were crawled and downloaded. Two focused crawling algorithms were implemented: (1) the baseline algorithm in which a simple text classifier, e.g., Naive Bayes, is used to classify and assign score to the URLs; and (2) the disclosed method using Algorithms 1 and 2. The target language in these experiments is chosen to be Hindi, and the meta-feature identified as most relevant for this language is the one based on transliteration. The Apache Nutch open source web search system (http://nutch.apache.org/) was used for implementing the focused crawling algorithm, and the Mallet classifier (http://mallet.cs.umass.edu/classification.php) was used for implementing the classification algorithms.

Figure 3:
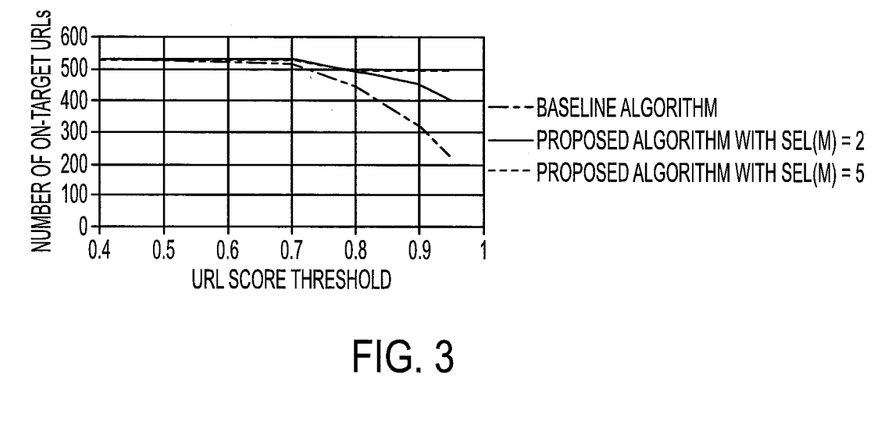
FIGS. 3-6 present experimental results as described herein.

With reference to FIG. 3, the number of on-target URLs fetched by the baseline algorithm and by the disclosed algorithm are plotted. FIG. 3 plots the score threshold, i.e., τ of URLs on the X-axis and the total number of on-target URLs crawled on the Y-axis. It is seen that, for any value of τ≥0.7, the number of on-target URLs fetched by the baseline algorithm goes on decreasing, whereas the number of on-target URLs fetched by the disclosed algorithm, with selectivity factor of transliteration meta-feature set to 5, hovers around 500 and does not decrease much. The maximum difference between the two algorithms in terms of on-target URLs crawled can be seen when the score threshold τ≥0.9. At this point, the baseline algorithm crawls only 221 on-target URLs whereas the disclosed algorithm (with selectivity factor of transliteration meta-feature set to 5) crawls 495 on-target URLs. FIG. 3 also shows the number of on-target URLs crawled if the selectivity factor of transliteration meta-feature is set to 2 in the disclosed crawling algorithm. In this case, the disclosed algorithm still performs significantly better than the baseline algorithm.

Figure 4:
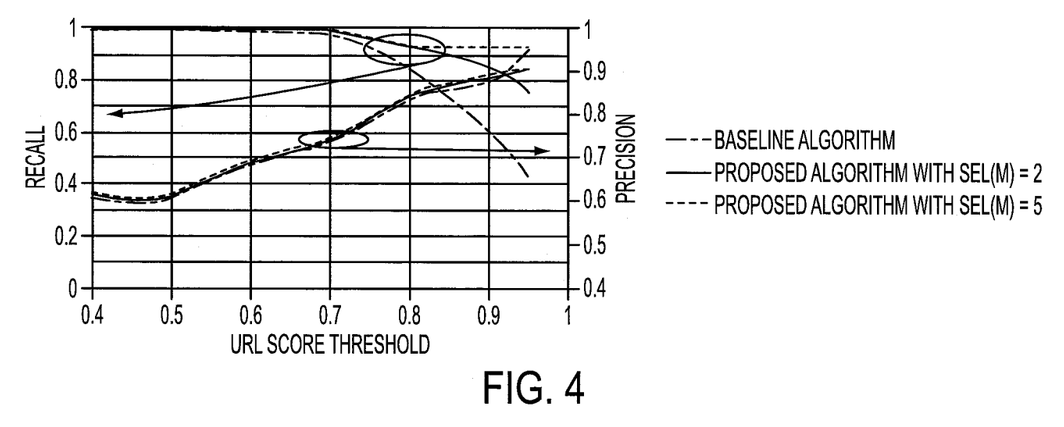

With reference to FIG. 4, the recall is plotted of the baseline algorithm as compared to the disclosed algorithm is with two different selectivity factor of transliteration meta-feature, i.e., 2 and 5. The score threshold is plotted, i.e., τ of URLs on the X-axis and the recall on the primary Y axis. The recall graph of these algorithms corresponds to what was shown in FIG. 3, i.e., if the score threshold τ is set to a low value like 0.4, then almost all the URLs encountered in the crawl process are actually fetched (because the score of almost all the URLs is greater than or equal to 0.4). But as the threshold τ is increased to values like 0.7, 0.8, indicating that it is intended to crawl only those URLs that have a high probability of being on-target, then the baseline algorithm fetches just 50% of what the disclosed algorithm is able to fetch.

With continuing reference to FIG. 4, precision is plotted on the secondary Y-axis. It is seen that precision of the two algorithms behaves quite similarly (that is, the precision graphs overlap in FIG. 4), and there is little difference for any value of τ until 0.9. At τ=0.95, it is seen that the precision of the baseline algorithm is 0.96 whereas the precision of the disclosed algorithm, with selectivity factor of transliteration meta-feature equals 5, is 0.9. But this difference is more than compensated for by the high recall of the disclosed algorithm.

Figure 5:
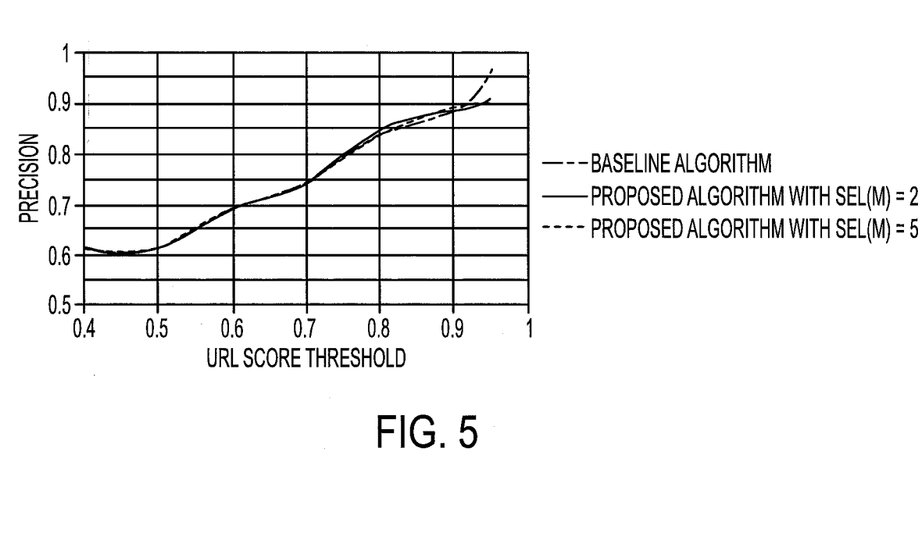

With reference to FIG. 5, a zoomed-in version of the precision of the algorithms is presented.

Figure 6:
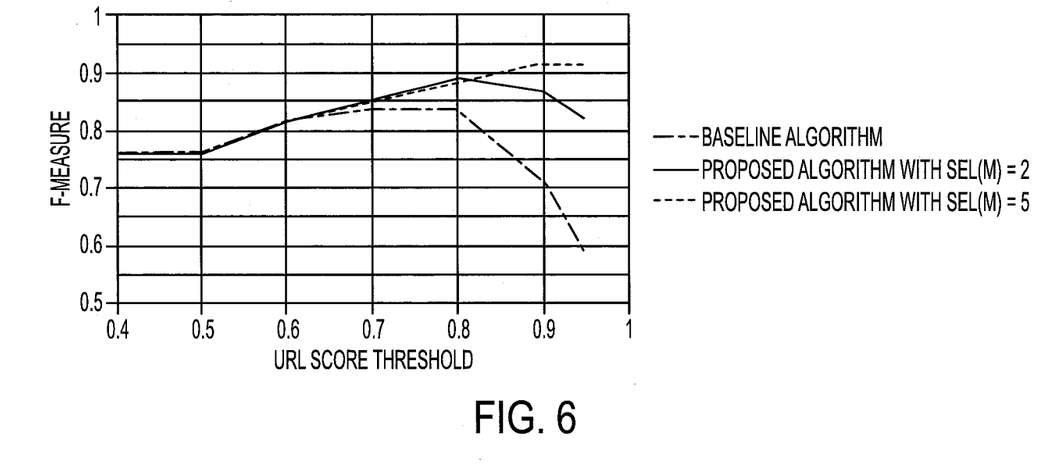

With reference to FIG. 6, the F-Measure is plotted of the baseline algorithm and the disclosed algorithm on the Y-axis and the score threshold on the X-axis. It can be seen that for high values of τ, the F-Measure of the baseline algorithm drops significantly to 0.6 whereas the F-Measure of the disclosed algorithm, with selectivity factor of transliteration meta-feature equals 5, is around 0.9.

While the illustrative embodiments pertain to web crawling, it is to be appreciated that the language-focused crawling techniques with target language hyperlink screening as disclosed herein are readily applied to crawling other types of databases, such as corporate intranets, wikis, and so forth. While the illustrative embodiment employs the screening criterion of the hyperlink score exceeding (or, optionally, equaling) screening threshold τ, the screening criterion can be formulated in other ways. For example, the aggregation of meta-features defining the score can be constructed such that a lower score corresponds to a higher likelihood of the document being in the target language, and the screening criterion in that case would suitably be score<threshold. While in the illustrative embodiment the features are extracted from the URL (more generally, linked document identifier) alone, in other embodiments it is contemplated to also extract features from the anchor text.

The illustrative embodiments employ binary meta-features, that is, meta-features having two possible discrete values: one value (e.g. "1") that biases toward the linked document being in the target language and the other value (e.g. "0") that biases away from the linked document being in the target language. However, it is contemplated for the meta-features to have three or more possible discrete values, or to have a continuous value.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions readable and executable by an electronic data processing device to perform a crawling method including the operations of:
   (i) identifying hyperlinks in a current document wherein each hyperlink links to a linked document and includes anchor text and a linked document identifier;
   (ii) scoring each hyperlink by
      parsing the hyperlink to identify features comprising character strings,
      computing values for one or more meta-features for each feature wherein the meta-features are indicative of the linked document being in a target language and the one or more meta-features include a transliterated target word meta-feature indicative of whether the feature is a transliterated word of the target language, and
      aggregating the meta-feature values of the features of the hyperlink to generate a score for the hyperlink; and
   (iii) downloading documents linked by hyperlinks of the current document whose scores satisfy a screening criterion and not downloading documents linked by hyperlinks of the current document whose scores do not satisfy the screening criterion.

2. The non-transitory storage medium of claim 1 wherein identifying operation (i) and the scoring operation (ii) are performed without downloading the documents linked by the hyperlinks of the current document.

3. The non-transitory storage medium of claim 1 wherein the one or more meta-features further include a language code meta-feature indicative of whether the feature is the language code indicating the target language.

4. The non-transitory storage medium of claim 1 wherein the parsing operates on the linked document identifier and not on the anchor text so that the features are identified in the linked document identifier but not in the anchor text.

5. The non-transitory storage medium of claim 1 wherein the linked document identifier is a Uniform Resource Locator (URL) and the parsing operates on the URL and not on the anchor text so that the features are identified in the URL but not in the anchor text.

6. The non-transitory storage medium of claim 1 wherein one of:
   the target language is Hindi and the one or more meta-features include a transliterated Hindi word meta-feature indicative of whether the feature is a transliterated Hindi word,
   the target language is Greek and the one or more meta-features include a transliterated Greek word meta-feature indicative of whether the feature is a transliterated Greek word,
   the target language is Russian and the one or more meta-features include a transliterated Russian word meta-feature indicative of whether the feature is a transliterated Russian word, and
   the target language is Chinese and the one or more meta-features include a transliterated Chinese word meta-feature indicative of whether the feature is a Chinese word expressed in pinyin.

7. The non-transitory storage medium of claim 1 wherein the aggregating comprises:
   weighting each meta-feature value by a meta-feature weight for that meta-feature; and
   aggregating the weighted meta-feature values of the features of the hyperlink to generate the score for the hyperlink.

8. The non-transitory storage medium of claim 2 wherein the crawling method further includes the operations of:
   (iv.0) determining based on the content of the current document whether the current document is in the target language;
   (iv.1) determining based on the content of each downloaded document whether the downloaded document is in the target language; and
   (v) constructing an index of documents that are in the target language based on the determining operations (iv.0) and (iv.1).

9. The non-transitory storage medium of claim 3 wherein the one or more meta-features further include a country code meta-feature indicative of whether the feature is the country code of a country in which the target language is regularly used.

10. The non-transitory storage medium of claim 7 wherein the crawling method further includes the operation of:
    (0) computing the meta-feature weights based on training data comprising hyperlinks or linked document identifiers each annotated as to whether the linked document is in the target language.

11. An apparatus comprising:
    a non-transitory storage medium storing instructions to perform a crawling method including the operations of:
      (i) identifying hyperlinks in a current document wherein each hyperlink links to a linked document and includes anchor text and a linked document identifier;
      (ii) scoring each hyperlink by parsing the hyperlink to identify features comprising character strings, computing values for one or more meta-features for each feature wherein the meta-features are indicative of the linked document being in a target language and the one or more meta-features include a transliterated target word meta-feature indicative of whether the feature is a transliterated word of the target language, and aggregating the meta-feature values of the features of the hyperlink to generate a score for the hyperlink; and (iii) downloading documents linked by hyperlinks of the current document whose scores satisfy a screening criterion and not downloading documents linked by hyperlinks of the current document whose scores do not satisfy the screening criterion; and an electronic data processing device operatively connected with the non-transitory storage medium to perform the crawling method by reading and executing the instructions stored on the non-transitory storage medium.

12. The apparatus of claim 11 wherein identifying operation (i) and the scoring operation (ii) are performed without downloading the documents linked by the hyperlinks of the current document.

13. The apparatus of claim 11 wherein the parsing operates on the linked document identifier and not on the anchor text so that the features are identified in the linked document identifier but not in the anchor text.

14. The apparatus of claim 11 wherein the linked document identifier is a Uniform Resource Locator (URL) and the parsing operates on the URL and not on the anchor text so that the features are identified in the URL but not in the anchor text.

15. The apparatus of claim 11 wherein one of:
the target language is Hindi and the one or more meta-features include a transliterated Hindi word meta-feature indicative of whether the feature is a transliterated Hindi word,
the target language is Greek and the one or more meta-features include a transliterated Greek word meta-feature indicative of whether the feature is a transliterated Greek word,
the target language is Russian and the one or more meta-features include a transliterated Russian word meta-feature indicative of whether the feature is a transliterated Russian word, and
the target language is Chinese and the one or more meta-features include a transliterated Chinese word meta-feature indicative of whether the feature is a Chinese word expressed in pinyin.

16. The apparatus of claim 11 wherein the aggregating comprises:
weighting each meta-feature value by a meta-feature weight for that meta-feature; and
aggregating the weighted meta-feature values of the features of the hyperlink to generate the score for the hyperlink.

17. A method comprising:
downloading from the Internet a web page identified by a uniform resource locator (URL) stored in a downloads queue;
identifying hyperlinks in the downloaded web page wherein each hyperlink includes a URL and anchor text; and
screening each hyperlink by parsing the hyperlink to identify features comprising character strings, computing for each feature values for one or more meta-features indicative of the hyperlinked web page being in a target language, aggregating the meta-feature values to generate a score for the hyperlink, and adding the URL of the hyperlink to the downloads queue conditional upon the score satisfying a screening criterion;
wherein the one or more meta-features include a transliterated target word meta-feature indicative of whether the feature is a transliterated word of the target language; and
wherein the downloading, identifying, and screening are performed by an electronic data processing device connected with the Internet.

18. The method of claim 17 wherein the one or more meta-features further include a language code meta-feature indicative of whether the feature is the language code indicating the target language.

19. The method of claim 17 wherein the parsing operates on the URL of the hyperlink and not on the anchor text of the hyperlink so that the features are identified in the URL of the hyperlink but not in the anchor text of the hyperlink.

20. The method of claim 18 wherein the one or more meta-features further include a country code meta-feature indicative of whether the feature is the country code of a country in which the target language is regularly used.

* * * * *